(12) United States Patent
Chenard

(10) Patent No.: US 10,947,065 B2
(45) Date of Patent: Mar. 16, 2021

(54) PELLET TRANSFER SYSTEM

(71) Applicant: Robert Joseph Chenard, Hay River (CA)

(72) Inventor: Robert Joseph Chenard, Hay River (CA)

(*) Notice: Subject to any disclaimer, the term of this patent is extended or adjusted under 35 U.S.C. 154(b) by 0 days.

(21) Appl. No.: 16/608,670

(22) PCT Filed: Apr. 25, 2018

(86) PCT No.: PCT/CA2018/000078
§ 371 (c)(1),
(2) Date: Oct. 25, 2019

(87) PCT Pub. No.: WO2018/195647
PCT Pub. Date: Nov. 1, 2018

(65) Prior Publication Data
US 2020/0198904 A1 Jun. 25, 2020

Related U.S. Application Data

(60) Provisional application No. 62/491,642, filed on Apr. 28, 2017.

(51) Int. Cl.
*B65G 53/26* (2006.01)
*B65G 53/24* (2006.01)
(Continued)

(52) U.S. Cl.
CPC ........... *B65G 53/24* (2013.01); *B65G 63/008* (2013.01); *F23K 3/02* (2013.01); *F24B 13/04* (2013.01);
(Continued)

(58) Field of Classification Search
CPC ........ B65G 53/24; B65G 53/26; B65G 53/60; B65G 65/32; F23K 3/02; F27D 3/18; F27D 2203/169
(Continued)

(56) References Cited

U.S. PATENT DOCUMENTS

RE27,471 E * 8/1972 Mundinger ............ B65G 53/00
406/129
3,822,919 A * 7/1974 Strom .................... B65G 53/22
406/90
(Continued)

OTHER PUBLICATIONS

International Search Report issued by the Canadian Intellectual Property Office dated Jul. 5, 2018 in connection with corresponding International PCT Patent Application No. PCT/CA2018/000078, 3 pages.
(Continued)

*Primary Examiner* — Joseph A Dillon, Jr.

(57) ABSTRACT

Disclosed is a system for transferring fuel pellets from a location external to a building to a location in an interior of the building. The system includes a first container positioned at a location remote from the building and a second container positioned proximate an exterior portion of the building. The first and second containers are connected to one another to permit the transfer of fuel pellets from the first container to the second container by a pneumatic apparatus. The second container is also connected with the interior of the building to permit the transfer of fuel pellets from the second container to the interior of said building.

28 Claims, 6 Drawing Sheets

(51) Int. Cl.
   B65G 63/00 (2006.01)
   F23K 3/02 (2006.01)
   F24B 13/04 (2006.01)

(52) U.S. Cl.
   CPC .. *B65G 2201/04* (2013.01); *B65G 2812/1625* (2013.01)

(58) Field of Classification Search
   USPC ....... 406/136, 141, 142, 151, 152, 153, 168; 222/400.5
   See application file for complete search history.

(56) References Cited

U.S. PATENT DOCUMENTS

| | | | | |
|---|---|---|---|---|
| 3,861,753 A * | 1/1975 | Lesk | ...................... | B65D 88/72 406/30 |
| 4,127,397 A * | 11/1978 | O'Nan, Jr. | ................. | G21F 9/00 55/479 |
| 4,278,163 A * | 7/1981 | Tomich | ..................... | E06B 5/02 193/34 |
| 4,394,259 A * | 7/1983 | Benny | ................... | A01K 79/00 209/143 |
| 4,973,203 A * | 11/1990 | Oftedal | .................. | B65G 53/42 406/113 |
| 4,988,240 A * | 1/1991 | Thompson | ............. | B65G 53/52 406/158 |
| 5,006,019 A | 4/1991 | Dziedzic, Jr. et al. | | |
| 5,151,000 A * | 9/1992 | Geraghty | ................. | F23K 3/16 110/248 |
| 5,341,856 A * | 8/1994 | Appenzeller | .......... | B65G 53/28 141/231 |
| 5,593,067 A * | 1/1997 | Shaw | ..................... | B67C 11/02 222/108 |
| 5,996,852 A * | 12/1999 | Johnson | ............... | B65G 11/026 222/181.2 |
| 6,379,086 B1 * | 4/2002 | Goth | ..................... | B65G 47/19 406/75 |
| 6,588,988 B2 * | 7/2003 | Zlotos | .................... | B65G 53/24 406/14 |
| 7,228,990 B2 * | 6/2007 | Schmidt | .................... | B28C 5/40 141/83 |
| 7,641,103 B1 * | 1/2010 | Tomich | ..................... | E06B 3/38 232/43.4 |
| 8,113,745 B2 * | 2/2012 | Aoki | .................... | B65G 53/525 406/126 |
| 9,758,319 B2 * | 9/2017 | Celella | ................... | B65G 53/26 |
| 10,106,338 B2 * | 10/2018 | Douglas | ................ | B65G 53/60 |
| 2008/0035675 A1 | 2/2008 | Norman | | |
| 2010/0226738 A1 | 9/2010 | Strimling et al. | | |
| 2011/0061738 A1 | 3/2011 | Strimling et al. | | |
| 2012/0177451 A1 * | 7/2012 | Kvalheim | .............. | B65G 53/40 406/151 |
| 2014/0255133 A1 * | 9/2014 | Wilkinson | ................ | B04C 5/10 414/291 |
| 2015/0344242 A1 | 12/2015 | Celella | | |

OTHER PUBLICATIONS

Written Opinion of the International Searching Authority issued by the Canadian Intellectual Property Office dated Jul. 5, 2018 in connection with corresponding International PCT Patent Application No. PCT/CA2018/000078, 5 pages.
Online Review by Chris—PelHeat: http://www.pelheat.com/wood_pellet_vacuum.html, Aug. 28, 2015, 3 pages.
Optimum Heat (Southern) Ltd., "Optimum iQ 3.0 System Features", http://www.optimumheat.co.uk/index_htm_files/Optimum-iQ-3.0-V1.1.pdf, at least as early as Feb. 21, 2017, 12 pages.
Energex American, Inc. and Energex Pellet Fuel, Inc., http://www.energex.com/BulkFuel.php, at least as early as Feb. 21, 2017, 2 pages.
Pellergy, LLC, "Bulk Wood Pellet Handling and Transfer", http://www.pellergy.com/bulk-wood-pellet-handling-and-transfer/, © 2015 Pellergy, LLC, 4 pages.
"Woodpecker Wood Pellet Vacuum System", Video available online at: https://www.youtube.com/watch?v=gtfZrFCZ2rU, Jun. 12, 2010.
"Energex Introduces PelletsExpress!", Video available online at: https://www.youtube.com/watch?v=1U__R3x28oU, Dec. 6, 2012.
"920 Pound Pellet Bulk Bin Transfer System", Video available online at: https://www.youtube.com/watch?v=Ek3xa9MiShc, Mar. 1, 2015.

* cited by examiner

PELLET TRANSFER SYSTEM

CROSS-REFERENCE TO RELATED APPLICATION

This application claims the benefit of U.S. Provisional Patent Application Ser. No. 62/491,642 filed on Apr. 28, 2017. The contents of the aforementioned application are incorporated by reference herein.

FIELD

The present disclosure relates to pellet transfer systems and methods, and in particular to systems and methods for transferring pellets, such as fuel pellets, to a location outside of a building to a location in an interior of a building.

BACKGROUND

Fuel pellets are pellets that can be used as a source of fuel in a combustion apparatus such as for example a stove or burner. Fuel pellets include biofuel pellets that may be made from compressed organic matter or biomass. Wood pellets are another common type of fuel pellets and are generally made from compacted sawdust and related wastes from the milling of lumber, manufacture of wood products and furniture, and construction. Wood pellets and other fuel pellets may be suitable for use in home and other buildings, and may be used as a source of energy when combusted, providing heat energy for heating the buildings. Accordingly, some homes and other buildings are equipped with fuel pellet burners. Some homes and other buildings rely on fuel pellets as a back-up source of fuel/energy, while others rely on fuel pellets primarily or exclusively as the source of fuel. For example, in remote geographical regions of the world, such as in Canadian rural areas, fuel pellets may be the primary source fuel for heating.

Fuel pellets may be sold to the average consumer in bags, such as 40 pound bags. Such bags can usually be handled by a single individual who can transport such bags from one location such as a storage location (which may be detached from a building) to another location where they can be unpacked and the fuel pellets used to feed a fuel pellet burner. This substantially manual system/method of moving fuel pellets from a storage location to a location where they can be fed into a burner is cheap and easy to employ for small scale uses of fuel pellets (e.g. for feeding a back-up heater in case of power outage, or feeding a stove in a seldom used cottage).

However, for homes and buildings that rely on the use of large amounts of fuel pellets, simply utilizing and moving bags that hold a relatively modest number/weight of fuel pellets to provide the necessary amount of fuel pellets for burners can be inconvenient. For example, a typical home relying solely on fuel pellets to provide heating from a burner may consume in the order of one or more tons of fuel pellets each year. Similarly, a large building, such as for example a hockey rink industrial warehouse/factory may consume in the order of tens of tons of fuel pellets each year. Such homes and buildings may utilize a storage container (e.g. a silo) having a large storage capacity and which may be located some distance from the building that contains the stove/burner. The large storage container can typically hold several weeks or even months' supply of pellets at a time. Such storage silos are typically replenished by large orders of pellets that are delivered by a transportation apparatus, such as truck.

Storage silos are often positioned at a significant distance the home or building that relies on the fuel pellets to accommodate deliveries by a truck. It may be advantageous to place the storage silos a significant distance from the home of building to reduce noise and dust resulting from the truck deliveries that may negatively impact individuals in close proximity to the storage silo. Also, locating a storage silo at a significant distance from the home/building may reduce the fire risk posed by the storage of a large volume of fuel pellets. However, external storage silos may be inconvenient to reach and difficult to access when it is desired to draw fuel pellets form the storage silo, such as in cold winter months.

Accordingly, alternate systems and methods are desired for transferring fuel pellets from a storage location external to and remote from a building to a location in an interior of a building.

SUMMARY

In overview, a system is disclosed for transferring fuel pellets, such as wood pellets, from a location remote/external to a building to a location within the interior of the building. The system may include two fuel pellet containers. A first container may be positioned at a location remote/a significant distance from the building and may be suitable for receiving and storing a relatively large volume of fuel pellets. This first container may be configured and suitably located to be able to receive and hold a large volume of fuel pellets from a delivery apparatus such as a truck.

A second container may be positioned close to/proximate/adjacent to an exterior portion of the building and may be suitable for receiving and storing a relatively smaller volume of fuel pellets than the first container. The first container and the second container may be in fuel pellet communication with one another. For example, a conduit may connect the first and second containers to permit the movement of fuel pellets from the first container to the second container. In addition, the second container may be in fuel pellet communication with a location within the interior of the building. For example, another conduit may extend from the second container located proximate/adjacent the exterior of the building, through a wall of the building, into the interior of the building.

The system may also include an apparatus that is operable to create an air pressure differential between the first container and the second container, such that the air pressure within the second container is substantially less than the air pressure in the first container. Accordingly, the air pressure within the second container may be substantially less than atmospheric air pressure when pneumatic apparatus is operational. The air pressure within the second container may return to atmospheric air pressure after pneumatic apparatus is switched off.

For example, a pneumatic apparatus, such as a vacuum generator, may be connected to and in air communication with the second container. When the pneumatic apparatus is operated, it may lower the air pressure within an inner cavity of the second container substantially below the air pressure in the ambient surroundings, and in particular below the air pressure within a cavity in the first container. This pressure difference may create an air flow from the interior of the first container through the connecting conduit to the second container. The air flow that is generated will be of sufficient velocity to create forces acting upon fuel pellets in the first container to cause the fuel pellets in the first container to move from the first container through the conduit into the second container.

Thus, the pneumatic apparatus may create an air flow which moves fuel pellets from the first container, which is remote from the building, to the second container, which is proximate to/adjacent to the exterior of the building. The pneumatic apparatus may be operated selectively and intermittently to load the second container with fuel pellets from the first container when desired.

The second container may be generally enclosed and may have a substantially sealed inner cavity that permits the pneumatic apparatus to reduce air pressure in the second container sufficiently to cause the fuel pellets held in the first container to be transferred from the first container through the connecting conduit into the second container.

Further, because the second container may also be in fuel pellet communication with the interior of the building, the fuel pellets in the second container may be easily transferred into the interior of the building when fuel pellets are required in the interior of the building.

A conduit may be connected at a bottom portion/region of the second container and may extend downwardly through a wall of the building into the interior of the building. This may allow the fuel pellets to flow into the building from the second container due to the force of gravity, without the use of a pneumatic apparatus or other driving apparatus. The fuel pellets may be received in the interior of the building and intermittently and selectively flow into a third container which may be manually movable by an individual, e.g. a bucket. The third container may be movable to allow the operator to move the fuel pellets from the outlet of the conduit from the second container, to the desired location in the building, e.g. to a stove or a furnace for use.

A valve mechanism such as a sliding trapdoor/gate may be mounted in a position to operably control the flow of fuel pellets through the conduit into the interior of the building. For example, a sliding trapdoor may be provided at the outlet of the conduit which extends from the second container into the interior of the building. The trapdoor may be manually movable between an open position and a closed position. When in the open position, fuel pellets from the second container can be transferred into the interior of the building; i.e. the fuel pellets may flow into the interior of the building due to gravity. When in the closed position, fuel pellets from the second container are blocked by the trapdoor. Accordingly, in use, the operator will open the trapdoor to receive fuel pellets as needed, and will close the trapdoor to seal the opening of the conduit from the second container. The system therefore provides to the operator pellets when the trapdoor is in the open position.

This arrangement means that the pneumatic apparatus only has to be operated intermittently. Fuel pellets from the second container, which flow from the second container into the interior of the building due to gravity, may be used on a relatively frequent basis (e.g. a day-to-day basis) until the second container is close to empty or is empty. Once the second container is empty (or near empty), the operator may then decide to turn on the pneumatic apparatus to move an additional batch of fuel pellets from the first container into the second container. Depending upon the relative height positioning of the inlet to the second container compared to the outlet from the first container, the pneumatic apparatus may have to generate sufficient air flow between the first container and the second container to overcome not only physical/frictional resistive forces resisting movement of the fuel pellets, but also gravitational forces.

This system allows an operator to access fuel pellets from within the interior of the building without the need to activate the pneumatic apparatus on a relatively frequent basis. While the pneumatic apparatus may be activated by a simple switch mounted in the interior of the building, by relying on gravity for fuel pellets on a day-to-day basis, the operator does not have to wait until the pneumatic apparatus has transferred fuel pellets each day. Further, the pneumatic apparatus may be powered using electrical power, which may not be available at all times (especially in remote regions) such as when an electrical generator is not operating.

According to one illustrative embodiment, there is provided a system for transferring a plurality of fuel pellets comprising a first container positioned at a location remote from a building and configured to hold a first volume of a plurality of fuel pellets; an enclosed second container positioned proximate an exterior portion of the building and configured to hold a second volume of a plurality of fuel pellets, the second container being in fuel pellet communication with the first container to permit the transfer of fuel pellets from the first container to the second container, and the second container also being in fuel pellet communication with a location in an interior of the building to permit the transfer of fuel pellets from the second container to the interior of the building; and an apparatus operable for generating an air pressure differential between the first container and the second container, such that the air pressure within the second container is substantially less than the air pressure in the first container and sufficient to cause fuel pellets held in the first container to be communicated from the first container to the second container.

According to another illustrative embodiment, there is provided a method for transferring a plurality of fuel pellets comprising holding in a first container a first volume of a plurality of fuel pellets, the first container being positioned at a location remote from a building and being in fuel pellet communication with an enclosed second container to permit the transfer of fuel pellets from the first container to the second container, and the second container being positioned proximate an exterior portion of the building; and selectively operating a pneumatic apparatus to generate an air pressure differential between the first container and the second container, such that the air pressure within the second container is substantially less than the air pressure in the first container and sufficient to cause fuel pellets held in the first container to be communicated from the first container to the second container, thereby transferring fuel pellets to the second container.

BRIEF DESCRIPTION OF THE DRAWINGS

In the figures which illustrate example embodiments.

DETAILED DESCRIPTION

Figure 1:
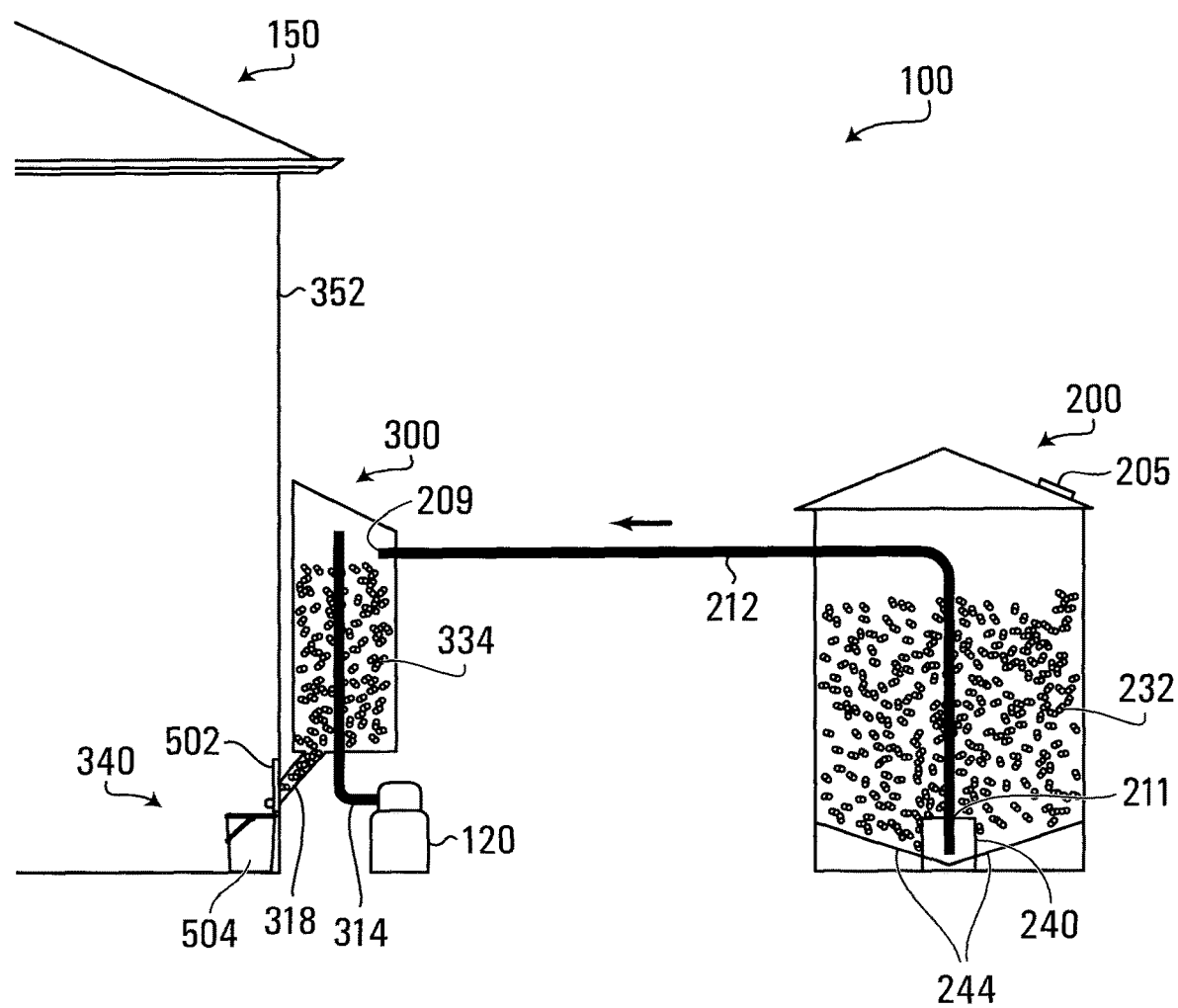
FIG. 1 shows a schematic view of a pellet transfer system in accordance with one embodiment.

With reference to FIG. 1, a schematic view of system 100 for transferring/moving fuel pellets is illustrated that may include a first container 200, a second container 300, and a pneumatic apparatus 120. Second container 300 may be located proximate/adjacent to an exterior wall 352 of a building 150 having an interior 340. First container 200 may be positioned at a location remote from second container 300 and building 150. For example, first container 200 and second container 300 may be positioned apart from each other at an approximate distance in the range of about 10 (or less) feet to 70 (or more) feet.

First container 200 may have a housing that defines an inner cavity that may hold a first volume of fuel pellets 232. The housing defining the cavity of first container 200 may be made of one or more strong, durable, air permeable and non-water permeable, materials. For example the housing of container 200 may be made of wood, rigid plastic, or metal. In some embodiments, the one or more materials forming first container 200 may be non-air permeable materials, but first container 200 may otherwise have openings that allow air to flow into first container 200, such as from the environment, in order to create the required air flows described herein.

The housing of first container 200 may be a multi-layer construction and may include an outer layer and an inner layer providing a surface that defines the wall of the inner cavity. Both inner and outer layers may be made of materials that are plyometric, wooden, or metallic.

First container 200 may have an opening 205 with a hinged door that may be selectively opened and closed. When the door is in an open configuration this may allow the transfer of fuel pellets from a delivery apparatus (e.g. a truck) into the inner cavity using a conventional system such as a pneumatic system for transferring pellets from the delivery apparatus to first container 200.

Second container 300 may also be generally enclosed and may be positioned proximate/adjacent to building 150. Second container 300 may have a housing that defines an inner cavity that may hold a second volume of fuel pellets 334. The housing defining the cavity of second container 300 may be made of one or more strong, durable, non-air and non-water permeable materials. For example the housing of container 300 may be made of wood, rigid plastic, metal.

The housing of second container 300 may be a multi-layer construction and may include an outer layer and an inner layer providing a surface that defines the wall of the inner cavity. Both inner and outer layers may be made of materials that are plyometric, wooden, or metallic.

Also, as shown in FIG. 1, pneumatic apparatus 120 may also be positioned proximate/adjacent to building 150 and proximate/adjacent to second container 300.

Also shown in FIG. 1 are a first conduit 212, that may fluidly connect first and second containers 200, 300; a second conduit 314, that may fluidly connect second container 200 and pneumatic apparatus 120; and a third conduit 318, that may fluidly connect second container 300 and interior 340 of building 150 through exterior wall 352. In the interior 340 of building 150 is an opening 524, which may have a valve mechanism such as a sliding trapdoor/gate 502 (best shown in FIGS. 5A-5B). In proximity to opening 524 may be a placed a third container 504 for receiving fuel pellets that flow through trapdoor 502 when it is an open operational configuration.

Accordingly, second container 300 is in fuel pellet communication with first container 200, through first conduit 212, to permit the transfer of fuel pellets from first container 200 to second container 300. Similarly, second container 300 is also in fuel pellet communication with a location interior 340 of building 150, through third conduit 318, to permit the transfer of fuel pellets from second container 300 to interior 340.

Figure 2A:
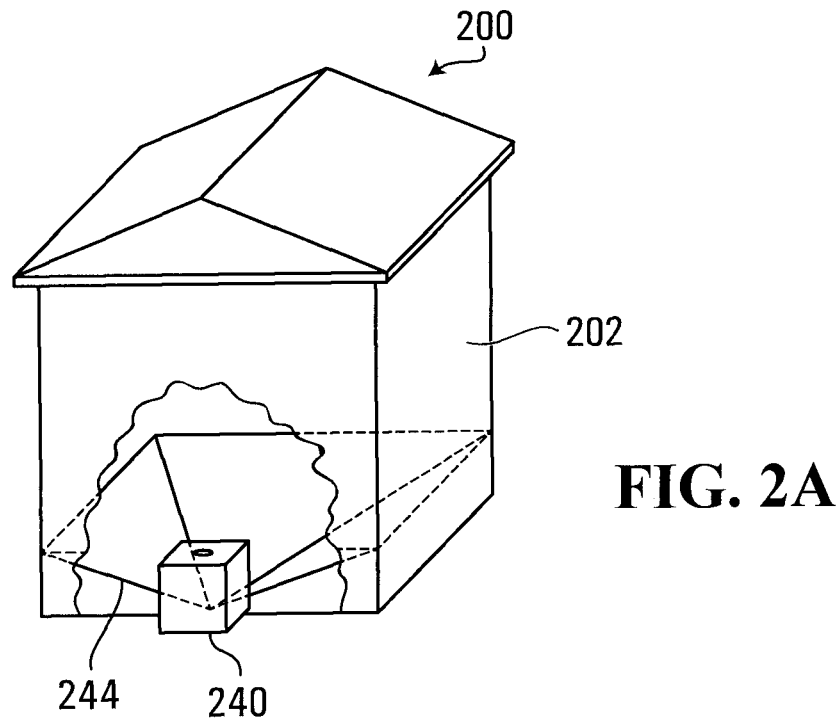
FIG. 2A shows a cut away perspective isolated view of a first container of the pellet transfer system of FIG. 1, in accordance with one embodiment.

Reference is now made to FIG. 2A illustrating an example embodiment of first container 200 in a perspective isolated view. As shown, first container 200 may have a cone-shaped/sloped bottom surface 244 in part defining inner cavity 202. Conically shaped/sloped bottom surface 244 may be provided with a bottom vertex at the base of first container 200. Fuel pellets 232 held in cavity 202 of first container 200 may, at least in part, be forced by gravity towards the vertex of bottom surface 244. At the bottom vertex of surface 244 may be connected a flow regulator 240, which may be in fuel pellet and air flow communication with first container 200 to permit and regulate the transfer of fuel pellets 232 from bottom portion 244 of first container 200 to flow regulator 240 and into conduit 212. Fuel pellets 232 in the vicinity of bottom surface portion 244 may move into flow regulator 240 at least in part by gravity.

Figure 2B:
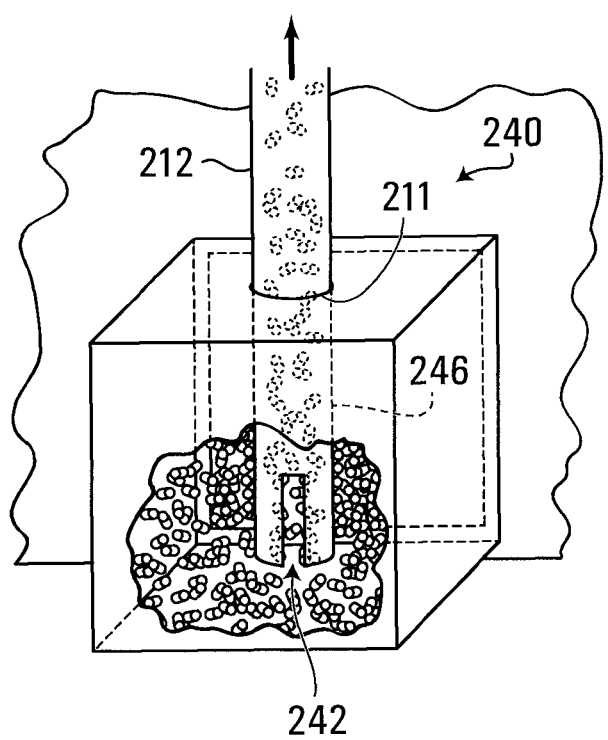
FIG. 2B shows a cut away perspective isolated view of a flow regulator of the pellet transfer system of FIG. 1, in accordance with one embodiment.

Shown in FIG. 2B is a close-up perspective view of flow regulator 240. Flow regulator 240 may have an upwardly extending conduit 246 with a lower cut-out inlet portion 242. Conduit 246 may be air flow and fuel pellet connected at an upper end thereof to an inlet 211 of first conduit 212. Conduit 246 may also be raised from the floor of flow regulator 240 by approximately 1 to 1.5 inches. The gap between the bottom of conduit 246 and floor of flow regulator 240 may permit fuel pellets and air to enter conduit 246.

When pneumatic apparatus 120 is activated, air may flow from cavity 202 of container 200 and into flow regulator 240 due to a pressure differential between first container 200 and second container 300. Fuel pellets in flow regulator 240 may then be drawn by the air flow generated, through the gap between the bottom of conduit 246 and floor of flow regulator 240, into conduit 246, then into first conduit 212, and finally into second container 300.

Lower cut-out inlet portion 242 may also permit additional air to flow from flow regulator 240 to second container 300 (through conduits 246 and 212) when pneumatic apparatus 120 is activated. Lower cut-out inlet portion 242 may help ensure that fuel pellets held in first container 200 are communicated through first conduit 212 in combination with an air flow to second container 300. This may reduce the likelihood that first conduit 212 will become clogged by word pellets during operation of pneumatic apparatus 120.

Further, as fuel pellets may be communicated in combination with an air flow which passes through cut-out portion 242 of flow regulator 240, flow regulator 240 may reduce/control the number of fuel pellets that can enter first conduit 212; further reducing the likelihood that first conduit 212 will become clogged.

Cut-out inlet portion 242 may be rectangular shaped having an approximate length of 2 to 4 inches and an approximate width of 0.5 to 1.5 inches. However, cut-out inlet portion 242 may be of any of any shape and size so long as it allows sufficient air to flow from flow regulator 240 to second container 300. Further, multiple cut-out inlet portions may be provided.

In some embodiments, the ratio of fuel pellets and air flow in the mixture flowing through conduit 212 may be selectively controlled and varied by adjusting the size of an open portion of cut-out inlet portion 242. Cut-out inlet portion 242 may have attached thereto a mechanism for selectively adjusting the size (e.g. length and/or width) of the open portion of cut-out inlet portion 242, such as a sliding door, which may be selectively positioned to vary the open portion of cut-out inlet portion 242. By adjusting the length and/or width of the open portion of cut-out inlet portion 242, an operator may easily vary the amount of air which is permitted to flow though from cavity 202 of container 200, through cut-out inlet portion 242 into first conduit 212. The more air that flows through cut-out inlet portion 242 into first conduit 212, the fewer fuel pellets will pass.

Figure 2C:
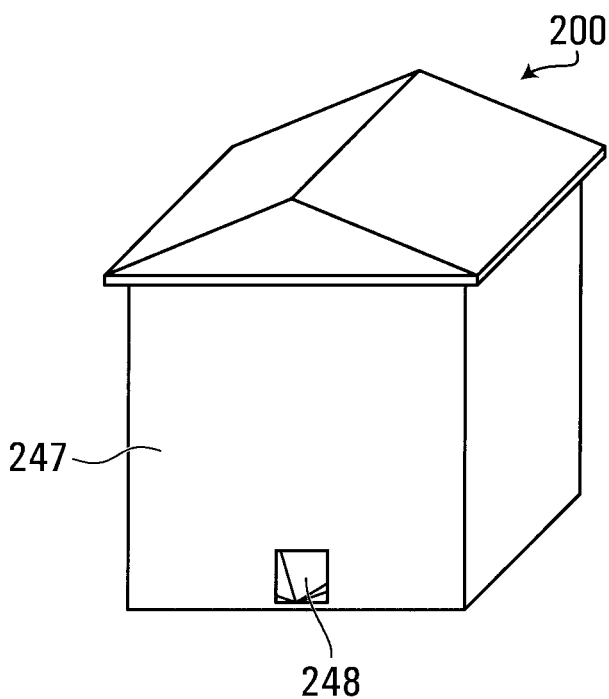
FIGS. 2C-2D show in perspective isolated view of a first container of the pellet transfer system of FIG. 1, in accordance with one embodiment.
Figure 2D:
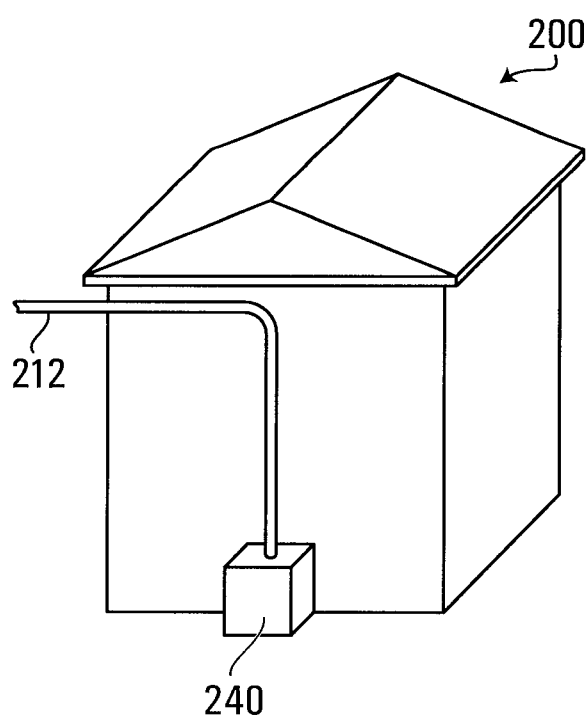

Reference is now made to FIGS. 2C and 2D, which illustrate in perspective view the exterior of an example first container 200. As shown, first container 200 may include a lower opening 248 in exterior wall 247 of first container 200 (FIG. 2C). Opening 248 may be air flow connected to the vertex of bottom surface portion 244 of container 200 and receive fuel pellets 242 from bottom portion 244 due in part to gravity. As shown in FIG. 2D, flow regulator 240 may be mounted to exterior wall 247 of container 200 and engage and be in communication with opening 248. As shown, flow regulator 240 may be attached on an exterior side of first container 200 to provide ease of access to flow regulator 240 for added convenience during operation, maintenance, and repairs. For example, an operator may access flow regulator 240 to adjust the size of an open portion of cut-out inlet portion 242.

Figure 3A:
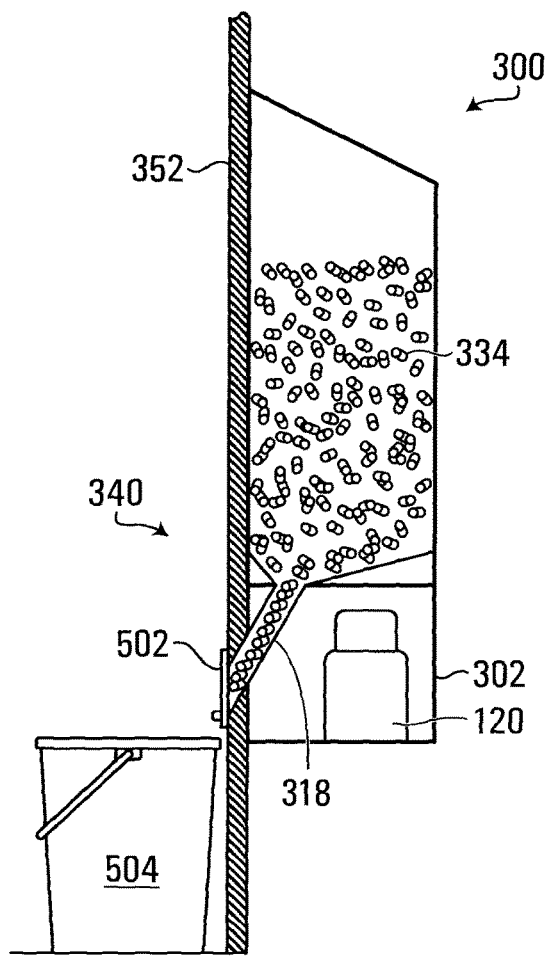
FIGS. 3A-3B show a partial schematic view of the pellet transfer system of FIG. 1, in accordance with various embodiments.
Figure 3B:
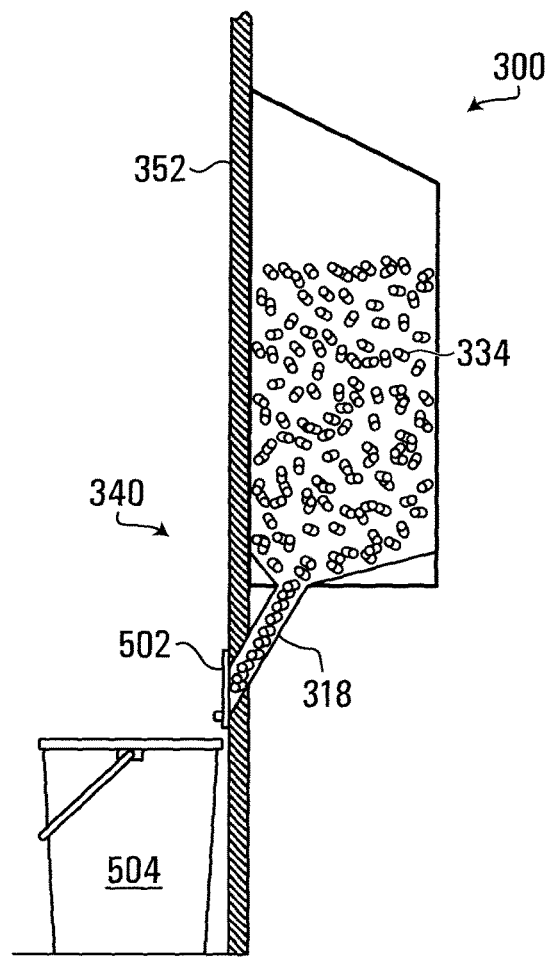

Reference is now made to FIGS. 3A and 3B where example embodiments of enclosed second container 300 are shown. Notably, shown in FIGS. 3A and 3B are schematic views of third conduit 318 connecting second container 300 and opening 524 in interior 340 of building 150 through exterior wall 352 to place second container 300 in fuel pellet communication with the interior 340 of building 150 to facilitate the movement of fuel pellets from second container 300 to the interior of building 150.

Third conduit 318 may extend downwardly from a bottom portion of second container 300, through exterior wall 352 of building 150, and terminate at an opening 524 at the interior side of exterior wall 352. In some embodiments, third conduit 318 extends from the base wall of second container 300 downwardly at a 30-45 degree angle from the horizontal, through exterior wall 352, thereby enhancing the effect of gravity, and reducing the number of fuel pellets that remain stuck in second container 300. In an embodiment as shown in FIG. 3B, the angle is a 45 degree angle.

Figure 5A:
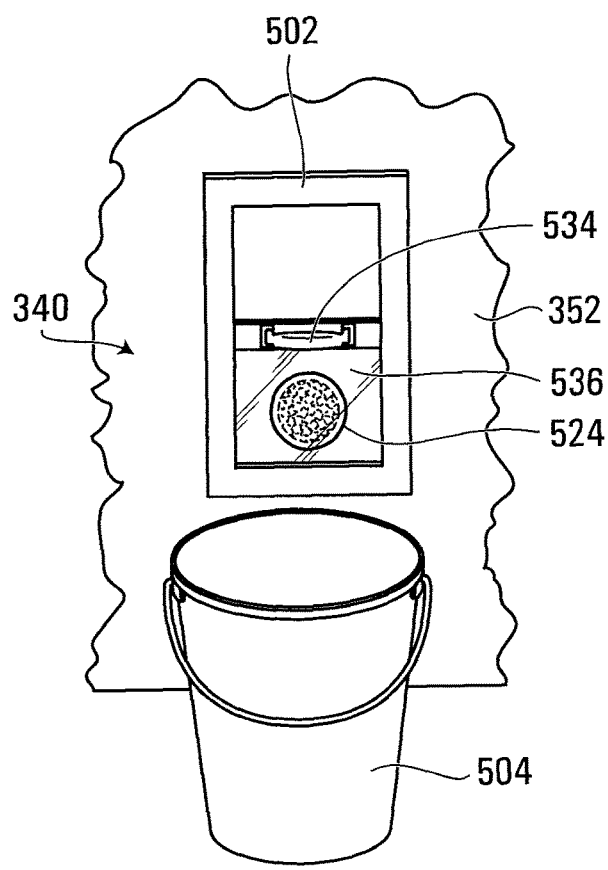
FIGS. 5A-5B show a partial perspective view of the pellet transfer system of FIG. 1, in accordance with one embodiment.
Figure 5B:
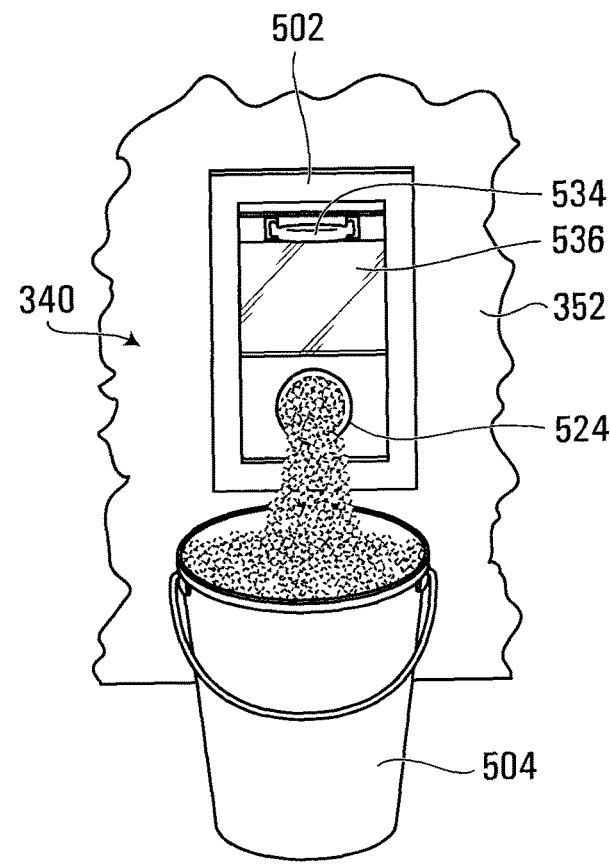

As shown in FIGS. 5A and 5B, a valve mechanism such as trapdoor 502 may selectively seal and unseal opening 524 such that when trapdoor 502 is in the open position, fuel pellets from second container 300 flow out of opening 524 due to gravity into third container 504 (FIG. 5B). Trapdoor 502 may also provide an air seal when in the closed position.

Trapdoor 502 will assist in sealing the interior cavity of container 300 such that any air flow generated within the interior cavity will flow from conduit 212 and into the pneumatic apparatus 120, thus increasing the efficiency of the pneumatic apparatus in creating the desired low air pressure in the cavity of second container 300 and the consequent air flow through conduit 212 from first container 200.

Figure 4A:
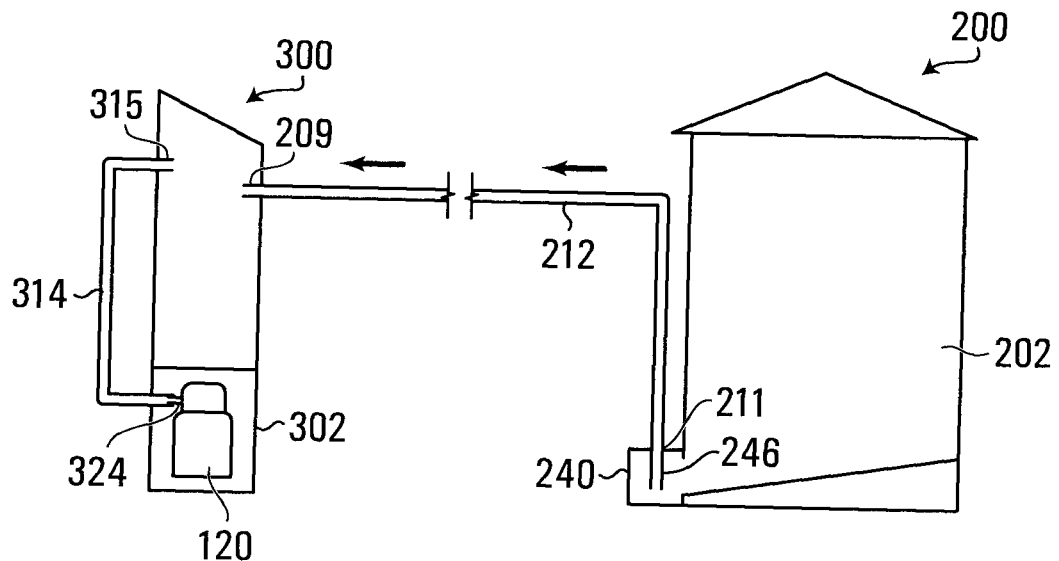
FIGS. 4A-4B show a partial schematic view of the pellet transfer system of FIG. 1, in accordance with various embodiments.

As shown in FIG. 3A and FIG. 4A, second container 300 may be an enclosed container mounted to external wall 352 of building 150 and pneumatic apparatus 120 may be located in a bottom cavity portion 302 of second container 300 (also mounted to external wall 352). This is convenient place to store pneumatic apparatus 120 for several reasons. First, pneumatic apparatus 120 can be placed in close proximity to second container 300, thereby increasing its effectiveness at transporting fuel pellets. Further, the second container 300 can easily be extended to store pneumatic apparatus 120, thereby reducing the need for an additional storage container.

Figure 4B:
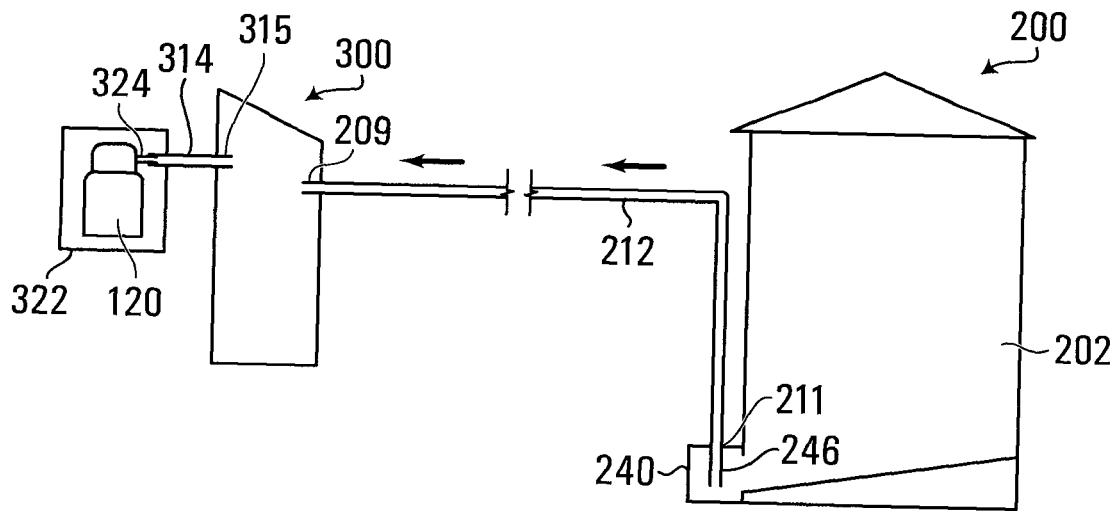

However, as shown in FIGS. 3B and 4B, pneumatic apparatus 120 may be stored in storage container 322 separate from second container 300. Storage container 322 may be mounted to exterior wall 352 of building 352 (not shown), or alternatively, may be placed adjacent to exterior wall 352 of building 150. In some embodiments (not shown) pneumatic apparatus 120 may be placed in the interior of building 150 to protect pneumatic apparatus 120 from weather elements and wildlife. However, second conduit 314 may then extend through external wall 352 to second container 300.

Second container 300 may have a housing that defines an inner cavity that may hold a second volume of fuel pellets that is significantly less that the volume of fuel pellets that can be held in first container 200. By way of example, first container 200 may have a fuel pellet storage capacity in the range of 100 to 200 kilograms, whereas second container 300 may have a storage capacity of fuel pellets in the range of one or more tons.

Shown in FIGS. 4A and 4B is a schematic view of first conduit 212 connecting first and second containers 200, 300 and placing first container 200 in fuel pellet and air flow communication with second container 300 to permit the transfer of fuel pellets from first container 200 to second container 300. First conduit 212 may be connected at one end 211 to flow regulator 240 at the bottom portion of first container 200, and the second end 209 to the top portion of second container 300.

Also shown in FIGS. 4A and 4B is a schematic view of second conduit 314 connecting second container 200 and pneumatic apparatus 120. Second conduit 314 may be connected at an inlet end 315 to a top portion of second container 200, and at the second end to suction end 324 of pneumatic apparatus 120, which is configured to draw air out of enclosed second container 300. Inlet end 315 of second conduit 314 may be positioned suitably in relation to outlet end 209 of first conduit 212 to efficiently create a reduced pressure within the cavity of second container 300 and an air flow that passes through the upper portion of the cavity of second container 300.

It will however be appreciated, that the air flow created by pneumatic apparatus 120 should not be such that fuel pellets exiting outlet end 209 of first conduit 212 are drawn into inlet end 315 of second conduit 314. Rather, fuel pellets exiting outlet 209 should remain in second container 300. This may be achieved in some embodiments by arranging inlet end 315 and outlet end 209 at an offset along the vertical axis relative to one another. This may also be achieved by attaching a mesh at inlet end 315 of second conduit 314, which blocks wood pellets from entering conduit 314 but permits air to flow.

Second container 300 is generally enclosed, particularly if trapdoor 502 closed, preventing air from flowing through conduit 318 into second container 300 from other than conduit 212. Thus, when pneumatic apparatus 120 is selectively operated to generate an air pressure differential between first container 200 and second container 300 (e.g. by reducing the air pressure in second container 300), air will flow from the inner cavity of container 300 to pneumatic apparatus 120. This will create an air flow from conduit 212 and from first container 200 into conduit 212. This air flow will thereby selectively generate an air flow force that generates forces that move fuel pellets held in first container 200 through first conduit 212 to said second container 300.

By drawing air from second container 300, pneumatic apparatus 120 reduces the air pressure inside enclosed second container 300 relative to the air pressure of first container 200 and relative to atmospheric air pressure. Pneumatic apparatus 120 therefore generates an air pressure within enclosed second container 300 that is lower than the air pressure with first container 200. If the difference in air pressure between first and second containers 200, 300 is sufficiently large, then pneumatic apparatus 120 will cause fuel pellets 232 held in first container 200 to be communicated from first container 200 to second container 300 by the resultant air flow.

After pneumatic apparatus 120 is switched off, the pressure differential between first container 200 and second container 300 may decrease substantially such that the air pressure within second container 300 returns to atmospheric air pressure.

As discussed above, second container 300 may have an inner cavity that is substantially air-sealed. It is generally easier for a pneumatic apparatus 120 to reduce the air pressure of a substantially air-sealed container 300. Accordingly, for a given pneumatic apparatus 120, when second container 300 is substantially air-sealed, pneumatic apparatus 120 will generate a larger pressure difference between first and second containers 200, 300 than if second container 300 was not substantially air-sealed.

Similarly, when second container 300 is substantially air-sealed, a pneumatic apparatus 120 providing a relatively lower-maximum suction power may be used.

Similarly, to compensate for any air-leakage in second container 300, a pneumatic apparatus 120 device having a relatively higher maximum suction power may be used. However, a more powerful pneumatic apparatus 120 will require more power and energy to operate and may generate more noise and heat. Further, if second container 300 has large openings and large air-leaks, then pneumatic apparatus 120 will not be able generate a pressure difference between first and second containers 200, 300 to create an air flow that is sufficient to cause fuel pellets held in first container 200 to be communicated from first container 200 to second container 300.

While the inner cavity of second container 300 may be generally enclosed and airtight, second container 300 also has openings to receive first conduit 212, second conduit 314, and third conduit 318. To improve the air-seal of second container 300, the pipes of each of first conduit 212, second conduit 314, and third conduit 318 may be provided with sealed connections to the walls of container 300 and/or the openings in the inner cavity of container 300, using glue, caulking, or other sealing compounds. Further, any gaps or openings in or between the walls of container 300 may be sealed using glue, caulking or other sealing compounds. Further, trapdoor 502 may be designed to be substantially airtight to reduce loss of pressure at and through third conduit 318.

Inlet end 315 of second conduit 314 may be connected at the top portion of second container 300 to avoid suction of fuel pellets 334 stored in second container 300 into pneumatic apparatus 120.

During operation of pneumatic apparatus 120, fuel pellets 232 held in upper compartment 202 of first container 200 may be communicated at least in part, by gravity, to the bottom portion 244 of first container 200 and into flow regulator 240. Once at flow regulator 240, the air pressure difference between first and second containers 200, 300 (when sufficiently large) causes fuel pellets to be communicated from flow regulator 240 of first container 200 and into the top portion of second container 300.

The flow rate of fuel pellets between first and second containers 200, 300 will depend, in part, on the suction power of pneumatic apparatus 120, the length of first conduit 212, the air-seal of second container 300 and the system generally, and the size and weight of fuel pellets.

Depending upon the relative height positioning of inlet 211 to second container 300 compared to the outlet 209 from first container 200, pneumatic apparatus 120 may have to generate sufficient air flow between first container 200 and second container 300 to overcome not only physical/frictional resistive forces resisting movement of the fuel pellets, but also gravitational forces (for example, as shown in FIGS. 4A and 4B).

Reference is now made to FIGS. 5A and 5B showing interior 340 of building 150. In interior 340 of building 150 is opening 524 going through wall 352 and which may be selectively sealed by trapdoor 502 mounted to the interior side of wall 352.

Trapdoor 502 may be movable between a closed position (FIG. 5A) and an open position (FIG. 5B). When in the open position, trapdoor 502 permits the transfer of fuel pellets from second container 300 to interior 340 of building 150 through third conduit 318. When in the closed position, trapdoor 502 seals opening 524 and seals third conduit 318. Trapdoor 502 may be configured as a sliding door/gate 536 which slides up and down (or right and left) to open and close, and a handle 534 to allow an operator to easily open and close the sliding door/gate. Sliding door/gate 536 may be made of plexiglass (which may aid in creating an air seal). Sliding door/gate 536 may be held in a place against wall 532 by a wooden or metallic frame. Other/additional sealing mechanisms may be employed to provide a seal between the sliding door and the wall/conduit.

In the interior of building 150, at the receiving end of opening 524, is third container 504. Third container 504 has an open top portion and is preferably a movable container that can be positioned to receive fuel pellets flowing out of second container 300 at the interior side of exterior wall 352. Movable third container 504 may then be used by an operator to carry fuel pellets inside building 150 to a fuel pellet stove and/or furnace.

In one illustrative embodiment, pneumatic apparatus 120 is a vacuum, such as a drum model Shop Vac®, which generates suction. In one illustrative embodiment, pneumatic apparatus 120 is a six horse-power vacuum cleaner, which is connected to a second conduit 314 having a two inch diameter inner passage. Further, first, second, and third conduits 212, 314, 318 may be made of PVC piping. Further, a two inch inner passageway diameter pipe is suitable for first conduit 212 and a 3.5 inch inner passageway diameter pipe is suitable for third conduit 318. This example setup may be suitable for moving fuel pellets (in particular, wood pellets) of standard industry size and weight (i.e. approx. 1.5 inch in length and 0.25 inch in diameter) along a first conduit 212 of up to 70 feet. Accordingly, first container 200 may be placed approx. 70 feet away from building 150. In this embodiment, it is observed that approx. 40 pounds of fuel pellets may be communicated every minute from first container 200 to second container 300. Such example parameters are merely illustrative, and a person of ordinary skill in the art will appreciate that modifications to such parameters are possible and may in fact be required for a given implementation.

In some embodiments, first container 200 is configured to store approx. 1 to 5 tons of fuel pellets (or an amount sufficient for 3-12 months' use) and second container 300 is configured to store approx. 100 to 200 kilograms of fuel pellets (or an amount sufficient for 3-14 days' use). Of course such parameters are merely illustrative and may be modified to suit any given implementation. However, as indicated above, first container 200 may be significantly larger in fuel pellet storage volume than second container 300. Further, the maximum capacity of first container 200 may have to be decreased if a flow regulator is not used as fuel pellets are more likely to clog first conduit without flow regulator. The maximum capacity of second container 300 may also be limited if second container 300 is mounted to an external wall of building 150.

System 100 is therefore suited for transferring a plurality of fuel pellets from a location external to building 150 to a location in an interior of the building. In operation, an operator causes first container 200 to receive and hold a first volume of fuel pellets 232. In one example, volume 232 is delivered to first container 200 by a truck.

Once first container 200 is holding volume 232 for storage, an operator may selectively operate pneumatic apparatus 120 to generate first air pressure within enclosed second container 300 that is lower than a second air pressure in first container 200 and sufficient to cause fuel pellets held in first container 200 to be communicated from first container 200 to second container 300. The air pressure difference created by pneumatic apparatus 120 thereby creates an air flow sufficient to transfer fuel pellets held in first container 200 to second container 300. As previously explained, a larger air pressure difference can be created without increasing the power of pneumatic apparatus 120 if second container 300 is substantially air-sealed.

Once second container 200 is holding a volume of fuel pellets 334 for storage, an operator may move trapdoor 502 mounted at a location in an interior of building 150 from a closed position to an open position to communicate fuel pellets from second container 200 to the interior of building 150. In one embodiment, fuel pellets 334 held in second container 200 are communicated to the interior of building 150 by gravitational force. An operator may also position a movable third container 504 to receive fuel pellets being transferred from second container 300 to the interior of building 150.

Of course, the above described embodiments are intended to be illustrative only and in no way limiting. The described embodiments are susceptible to many modifications of form, arrangement of parts, details, and order of operation. The invention is intended to encompass all such modification within its scope, as defined by the claims.

The invention claimed is:

1. A system for transferring a plurality of pellets comprising:
a first container configured to hold a first volume of a plurality of pellets;
a second container physically separated from said first container and positioned proximate a wall of the building, said second container configured to hold a second volume of a plurality of pellets, said second container being in pellet communication with said first container through a first conduit, said second container also operable to selectively transfer pellets from said second container to a third container when said third container is located proximate said second container;
an apparatus operable for generating an air pressure differential between said first container and said second container, such that the air pressure within said second container is substantially less than the air pressure in said first container and sufficient to cause pellets held in said first container to be communicated through said first conduit from said first container to said second container when said apparatus generating an air pressure differential is activated;
wherein said apparatus for generating an air pressure differential comprises a vacuum apparatus that comprises a second conduit, said second conduit having a suction end connected, to a top portion of said second container for generating said air pressure differential.

2. The system of claim 1, wherein said air pressure differential generates an air flow which create forces acting upon pellets in said first container to cause said pellets in said first container to move from the first container through said first conduit into the second container.

3. The system of claim 1, wherein said apparatus for generating an air pressure differential is operable to reduce said air pressure within said second container such that the air pressure within said second container is substantially less than atmospheric air pressure.

4. The system of claim 1, wherein said second container has a substantially sealed inner cavity.

5. The system of claim 1, wherein said first container has a generally conically shaped bottom surface.

6. The system of claim 5, wherein said conically shaped bottom surface has a vertex at the base of said first container.

7. The system of claim 6, wherein said first container is connected to a flow regulator that is operable to control the flow of pellets to said first conduit, said flow regulator is connected to said vertex such that pellets move into said flow regulator at least in part by gravity.

8. The system of claim 7, wherein said flow regulator is in pellet communication with said first container to permit the transfer of pellets from said first container to said flow regulator.

9. The system of claim 8, wherein said first conduit has an inlet end and an outlet end, said inlet end being in communication with said flow regulator and said outlet end being in communication with said top portion of said second container.

10. A system for transferring a plurality of pellets comprising:
a first container configured to hold a first volume of a plurality of pellets;
an enclosed second container physically separated from said first container and positioned proximate a wall of the building, said second container configured to hold a second volume of a plurality of fuel pellets, said second container being in pellet communication with said first container through a first conduit, said second container also operable to selectively transfer pellets from said second container to a third container, when said third container is located proximate said second container;
an apparatus operable for generating an air pressure differential between said first container and said second container, such that the air pressure within said second container is substantially less than the air pressure in said first container and sufficient to cause pellets held in said first container to be communicated through said first conduit from said first container to said second container when said apparatus for generating an air pressure differential is activated;

wherein said first container is connected to a flow regulator having a conduit with a lower cut-out portion, said lower cut-out portion configured to permit air to flow from said flow regulator through said first conduit to said second container when said apparatus for generating an air pressure differential is activated.

11. The system of claim 1, wherein said pellets held in said first container are communicated in combination with an air flow to said second container.

12. The system of claim 10, wherein said lower cut-out portion has an open portion, and wherein said lower cut-out portion attached thereto a mechanism for selectively adjusting the size of said open portion.

13. The system of claim 10, wherein said apparatus is configured to selectively generate said air pressure differential, thereby selectively communicating pellets held in said first container to said second container.

14. The system of claim 10, wherein said second container is mounted to an exterior wall of the building.

15. The system of claim 1, further comprising a third conduit extending from said second container downwardly through an external wall of the building and into said interior of the building to permit the transfer of pellets from said second container to said interior of said building and into said third container when said third container is located within an interior space of said building.

16. The system of claim 15, wherein said pellets are transferred from said second container to said interior of said building through said third conduit at least in part by gravity.

17. The system of claim 10, further comprising a third container positioned proximate said location in said interior of said building for receiving pellets from said second container.

18. The system of claim 1, further comprising a trapdoor mounted at said location in said interior of said building, said trapdoor movable between an open position and a closed position, wherein the open position permits the transfer of pellets from said second container to said interior of said building and the closed position seals an opening at said location in said interior of said building.

19. The system of claim 15, further comprising a valve mechanism mounted at said location in said interior of said building, said valve mechanism operable to move between an open position and a closed position, wherein the open position permits the transfer of pellets from said second container to said interior of said building and the closed position seals an opening at said location in said interior of said building.

20. An apparatus of claim 1 wherein said pellets are fuel pellets.

21. The system of claim 15, wherein said fuel pellets are wood fuel pellets.

22. The system of claim 1, wherein said vacuum apparatus comprises a vacuum generator that is positioned at a location external of said building.

23. The system of claim 1, wherein said vacuum generator is mounted to an exterior side surface of an external wall of said building.

24. The system of claim 1, wherein said vacuum generator is configured to be activated and deactivated by a switch located within said building.

25. The system of claim 1, wherein said first container is in pellet communication with said second container through said first conduit, wherein said first conduit has an inlet end and an outlet end, said outlet end of said first conduit being in communication with a top portion of said second container, and wherein said suction end of said second conduit is located vertically above said outlet end of said first conduit.

26. The system of claim 25 wherein said inlet end of said first conduit is in communication with a flow regulator.

27. The system of claim 1 wherein said second container is an enclosed container.

28. The system of claim 1 wherein said first volume of pellets is larger than said second volume of pellets.

* * * * *